US008282695B2

(12) United States Patent
Shibuya et al.

(10) Patent No.: US 8,282,695 B2
(45) Date of Patent: Oct. 9, 2012

(54) AIR CONDITIONER

(75) Inventors: Makoto Shibuya, Kanagawa (JP);
Shinji Sugiyama, Kanagawa (JP)

(73) Assignee: Fujitsu General Limited, Kawasaki-shi (JP)

( * ) Notice: Subject to any disclaimer, the term of this patent is extended or adjusted under 35 U.S.C. 154(b) by 350 days.

(21) Appl. No.: 12/352,860

(22) Filed: Jan. 13, 2009

(65) Prior Publication Data
US 2009/0183471 A1    Jul. 23, 2009

(30) Foreign Application Priority Data

Jan. 17, 2008    (JP) ................ 2008-007506

(51) Int. Cl.
B01D 46/00    (2006.01)
(52) U.S. Cl. ............... 55/283; 55/289; 55/295; 55/296; 55/429
(58) Field of Classification Search .............. 55/283, 55/285, 289, 290, 291, 293, 295, 296, 297, 55/298, 299, 300, 282.2; 62/303–316; 165/95, 165/303, DIG. 11, DIG. 85, 4–10, DIG. 10; 454/187
See application file for complete search history.

(56) References Cited

U.S. PATENT DOCUMENTS

| | | | | |
|---|---|---|---|---|
| 3,221,479 A | * | 12/1965 | Moser et al. | 55/296 |
| 5,626,517 A | * | 5/1997 | Kil | 454/315 |
| 6,244,954 B1 | * | 6/2001 | Hosokawa et al. | 454/315 |
| 6,338,382 B1 | * | 1/2002 | Takahashi et al. | 165/96 |
| 6,729,154 B2 | * | 5/2004 | Takashima et al. | 62/317 |
| 6,786,061 B2 | * | 9/2004 | Asami et al. | 62/263 |
| 7,350,371 B2 | * | 4/2008 | Lee et al. | 62/317 |
| 7,827,810 B2 | * | 11/2010 | Hur et al. | 62/126 |
| 2007/0060036 A1 | * | 3/2007 | Shibuya et al. | 454/187 |

FOREIGN PATENT DOCUMENTS

| | | |
|---|---|---|
| EP | 1 762 790 A2 | 3/2007 |
| JP | 07-275626 A | 10/1995 |
| JP | 2004-113896 A | 4/2004 |
| JP | 2006-071135 A | 3/2006 |
| JP | 2007-107764 | 4/2007 |
| JP | 2007-271174 A | 10/2007 |

* cited by examiner

*Primary Examiner* — Duane Smith
*Assistant Examiner* — Thomas McKenzie
(74) *Attorney, Agent, or Firm* — Venable LLP; Michael A. Sartori; Steven J. Schwarz

(57) ABSTRACT

An air conditioner has a dust catch filter interposed between an inlet and a heat exchanger, a cleaning unit 5 for removing dust caught by the filter, and filter driver 18 for reciprocally driving the filter with respect to the cleaning unit 5. The cleaning unit 5 has a dust box 21 having a cleaning brush for removing dust caught on the surface of the filter and a filter hold plate that is attached to the dust box 21 and that holds a rear surface of the filter. The air conditioner is provided with cleaning brush driver 20 that draws the cleaning brush from the dust box 21 and brings the cleaning brush into contact with the filter during cleaning of the filter and that separates the cleaning brush from the filter and puts the cleaning brush in the dust box 21 when the filter is not cleaned.

4 Claims, 14 Drawing Sheets

AIR CONDITIONER

BACKGROUND OF THE INVENTION

The present invention relates to an air conditioner equipped with a cleaning unit that automatically removes dust, dirt, yarn wastes, and the like, all of which adhere to filters (which will be called "dust" in the following descriptions) and, more particularly, to a structure that enables prevention of a decrease in dust removal power of cleaner (which will be called a "cleaning brush" in the following descriptions) and normal cleaning of a filter.

An indoor unit of an air conditioner has hitherto been equipped with a filter for preventing entry of dust into the indoor unit from an air inlet. Since the dust settles on the filter with elapse of time, a user must remove the filter from the indoor unit at the most suitable time and clean the thus-removed filter.

Since the indoor unit of the air conditioner is usually disposed at an elevated location in a room, operation for removal attachment of the filter is laborious, and operation for diligently removing dust adhering to the filter is also laborious, and hence operation for cleaning the filter tends to be avoided.

However, if the filter is left while dust remains settled on the filter, the rate of flow of air will decrease, which may deteriorate the efficiency of heat exchange, cause mold to grow in the dust, and induce a foul odor or house dust which will be responsible for an allergy condition. Accordingly, some air conditioners equipped with a cleaning unit that automatically cleans dust adhering to a filter have recently been provided and received attention.

In a structure of a cleaning unit known as such an indoor unit of an air conditioner having a cleaning unit, the cleaning unit itself is moved from one side to the other side of a filter while a cleaning brush remains in contact with the filter, thereby removing the dust adhering to the filter and recover the thus-removed dust (see; for instance, Patent Document 1).

In the indoor unit of the air conditioner described in Patent Document 1, as shown in FIGS. 18 and 19, a main unit cabinet 100 has an air inlet 121 provided over the entire surface of an upper surface panel 106 and an air outlet 113 equipped with right and left wind direction plates 115, up and down wind direction plates 116, and the like. A blow fan 101 and heat exchangers 102a to 102c are housed in the main unit cabinet 100.

Interposed between the air inlet 121 and the heat exchangers 102a, 102b and 102c are a filter 103 for catching dust included in an air that has been taken in from the air inlet 121 and travel toward the heat exchangers 102a, 102b and 102c; a cleaning unit 300 for removing the dust adhering to the filter 103; and a guide frame 210 that supports the filter 103 and that is intended for vertically reciprocating the cleaning unit 300 along the filter 103.

As shown in FIG. 20, the cleaning unit 300 that travels along the filter 103 is equipped with a dust box 300a. The dust box includes a box main unit 310 having open upper and lower surfaces; a top panel 320 that covers an opening in an upper surface of the box main unit 310; a cleaning brush 330 disposed on a front surface side of the filter 103 in a rotatable and contactable manner; and dust collector 340 (hereinafter taken as a "dust collection brush" in the following descriptions) that is provided on one interior side surface of the box main unit 310 and that scrapes the dust adhering to the cleaning brush 330.

Further, a filter support plate 300b is provided by way of a box mounter 250 that supports the dust box 300a. The filter support plate has a base plate 410 extending between the guide frames 210 and a support main unit 420 that is attached integrally to the base plate 410 and that supports a back side of the filter 103.

From the above, the cleaning unit 300 of Patent Document 1 is configured such that the dust box 300a having the cleaning brush 330 is arranged on the front surface side of the filter 103; that the filter support plate 300b for supporting the filter 103 is disposed on the back side of the filter 103 opposing the dust box 300a; and that the dust box 300a and the filter support plate 300b are vertically moved along the guide frame 210, thereby removing the dust adhering to the filter 103. The dust removed by the cleaning brush 330 can be collected by the dust collection brush 340 and stored in the dust box 300a; hence, contamination of the inside of the main unit cabinet 100, which would otherwise be caused when the dust is scattered outside, can be prevented.

In the indoor unit of the air conditioner having the cleaning unit 300 described in Patent Document 1, the cleaning unit 300 is vertically moved along the guide frame 210 at the time of cleaning of the filter 103; dust is removed by bringing the cleaning brush 330 into contact with the surface of the filter 103; and the thus-removed dust is scratched and collected by the dust collection brush 340. In the meantime, when the filter 103 is not cleaned, the cleaning unit 300 is returned to lower ends of the guide frames 210 that serve as a home position and remains on standby while held in contact with the surface of the filter 103.

As shown in FIG. 19, the cleaning unit 300 is designed so as to enable the user to remove the dust box 300a from the box mounter 250. A top panel 320 is removably attached to one end of the box main unit 310, and the user can sweep the dust box 300a by opening the top pane 320.

However, even when the filter 103 is not cleaned, the cleaning brush 330 remains in contact with the surface of the filter 103. Hence, if the cleaning brush 330 is left until when the filter 103 is cleaned, ends of the cleaning brush 330 will be kinked and deformed. There is no alternative way but to exchange the cleaning brush 330 having the kinked ends.

In the meantime, in a case where the user rotates the cleaning brush 330 by means of cleaning the dust box 300a itself and closes the top panel 320 while the cleaning brush is directed to the outside of the box main unit 310, the cleaning brush 330 is left until the time when the filter 103 is cleaned while remaining in contact with the surface of the filter 103 when the thus-removed dust box 300a is attached to the box mounter 250. Accordingly, the ends of the cleaning brush 330 will be deformed as in the case where the filter 103 is not cleaned.

Therefore, at the time of actual cleaning of the filter 103, the ends of the cleaning brush 330 fail to properly contact the filter 103 by means of deformation of the ends of the cleaning brush 330. Dust removal capability of the filter 103, which could originally be exhibited, is deteriorated, thereby posing a problem of a failure to properly clean the filter 103.

[Patent Document 1] JP-A-2007-107764 (pp. 6 to 13, FIGS. 2, 6, and 13)

SUMMARY OF THE INVENTION

The present invention has been conceived in view of the problem and aims at providing an air conditioner having a cleaning unit that prevents deterioration of dust removal capability of cleaner during cleaning of a filter and enables proper cleaning of the filter.

In order to solve the problem, according to a first aspect of the invention, there is provided an air conditioner including:

a dust catch filter interposed between an inlet and a heat exchanger, a cleaning unit that removes the dust caught by the filter, the cleaning unit having a dust box equipped with cleaner for removing the dust caught on a surface of the filter, and a first driver for moving either the filter or the cleaning unit, and a second driver for driving the cleaner for drawing the cleaner out of the dust box and bringing the cleaner into contact with the filter when the filter is cleaned, and separating the cleaner from the filter and putting the cleaner into the dust box when the filter is not cleaned.

According to a second aspect of the invention, there is provided the air conditioner according to the first aspect, wherein the dust box is removably positioned with respect to a frame disposed in a casing and includes: a reservoir for storing dust removed by the cleaner, a reclosable cover reclosably attached to the reservoir, and dust collector that recovers the dust removed by the cleaner in the reservoir, the cleaner is rotatably supported at both ends of the reservoir by means of a rotary shaft, and includes an urging member for urging the cleaner toward inside of the reservoir;

the dust collector is rotatably supported at both ends of the reservoir by a rotary shaft, and includes an urging member for urging the dust collector toward the cleaner and a lever joined to one end of the rotary shaft of the dust collector;

the reclosable cover includes an arm opposing the lever joined to one end of the rotary shaft of the dust collector; and the dust collector is separated from the cleaner by closing the reclosable cover and pressing the lever with the arm.

According to a third aspect of the invention, there is provided the air conditioner according to the first aspect, wherein the driver reciprocally moves the filter or the cleaning unit.

According to an embodiment, there is provided another driver that drives cleaner for drawing the cleaner out of the dust box and bringing the cleaner into contact with the filter at the time of cleaning of the filter and separating the cleaner from the filter and putting the cleaner into the dust box when the filter is not cleaned. When the filter is not cleaned, the cleaner is separated from the filter and stays in the dust box at all times. Hence, deformation of a brush of the cleaner is prevented, and deterioration of dust removal capability of the cleaner achieved at the time of cleaning of the filter is prevented, and the filters can be cleaned properly.

According to another embodiment, the reclosable cover is closed, and the lever is pressed by the arm, whereby the dust collector is separated from the cleaner. Even when the cleaner is drawn out of the dust box along with internal cleaning of the cleaning unit, the dust collector can be separated from the cleaner by means of closing only the reclosable cover, which is normal operation, after internal cleaning of the cleaning unit. When the reclosable cover is closed, the cleaner can be put in the dust box by the urging member of the cleaner.

Moreover, according to a further embodiment, the driver reciprocally moves the filter or the cleaning unit.

BRIEF DESCRIPTION OF THE DRAWINGS

FIGS. 1A and 1B are views showing an indoor unit of an air conditioner of the present invention, wherein FIG. 1A is an external perspective view, and FIG. 1B is a cross-sectional view schematically showing an internal structure of the indoor unit;

FIGS. 2A and 2B are views showing the indoor unit of the air conditioner of the present invention, wherein FIG. 2A is a perspective view showing the indoor unit when a reclosable grill is removed, and FIG. 2B is a perspective view showing the indoor unit when the reclosable grill and an intake grill are removed;

FIGS. 3A and 3B are descriptive views of the principle sections showing a position where a filter of the present invention is cleaned, wherein FIG. 3A is a cross-sectional view showing the filter moved to a position in front of a heat exchanger, and FIG. 3B is a cross-sectional view showing the filter moved to a rear position;

FIGS. 4A and 4B are descriptive views of the principle section of the indoor unit of the air conditioner of the present invention, wherein FIG. 4A is a perspective view of a frame section consisting of a front frame and a rear frame, and FIG. 4B is a perspective view showing that the front frame is removed from the rear frame;

FIGS. 14A and 14B are cross-sectional views showing an open state of the reclosable cover of the dust box of the cleaning unit, wherein FIG. 14A is a cross-sectional view taken along line A-A' shown in FIG. 11, and FIG. 14B is a cross-sectional view taken along line B-B' shown in FIG. 11;

FIGS. 16A and 16B are cross-sectional views showing a process of the cleaner returning to the inside of the dust box after the user has conducted internal cleaning while the reclosable cover of the dust box of the cleaning unit of the present invention is half closed, wherein FIG. 16A is a cross-sectional view equivalent to a cross section A-A' shown in FIG. 11, and FIG. 16B is a cross-sectional view equivalent to a cross-section B-B' shown in FIG. 11;

FIGS. 17A and 17B are cross-sectional views showing that the cleaner fully enters the dust box after the user has conducted internal cleaning while the reclosable cover of the dust box of the cleaning unit of the present invention is closed, wherein FIG. 17A is a cross-sectional view taken along line C-C' shown in FIG. 10, and FIG. 17B is a cross-sectional view taken along line D-D' shown in FIG. 10;

DETAILED DESCRIPTION OF THE PREFERRED EMBODIMENTS

Figure 1A:
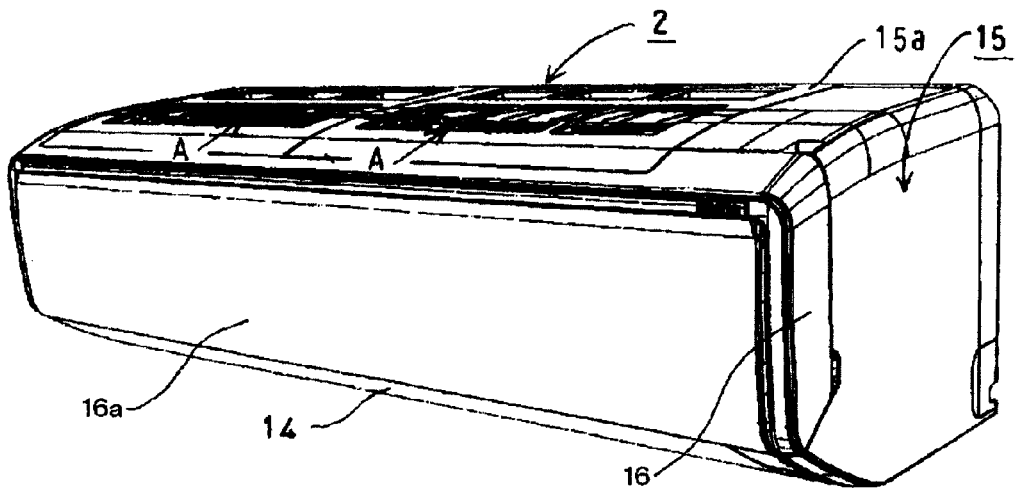
Figure 1B:
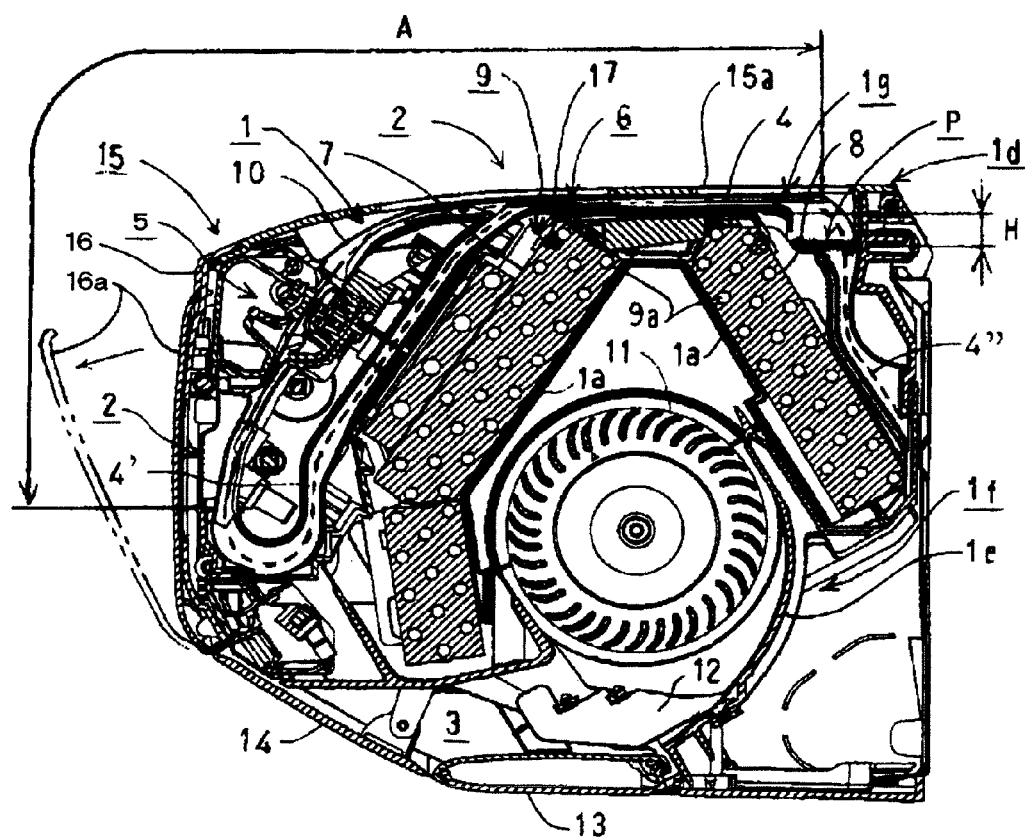
Figure 2A:
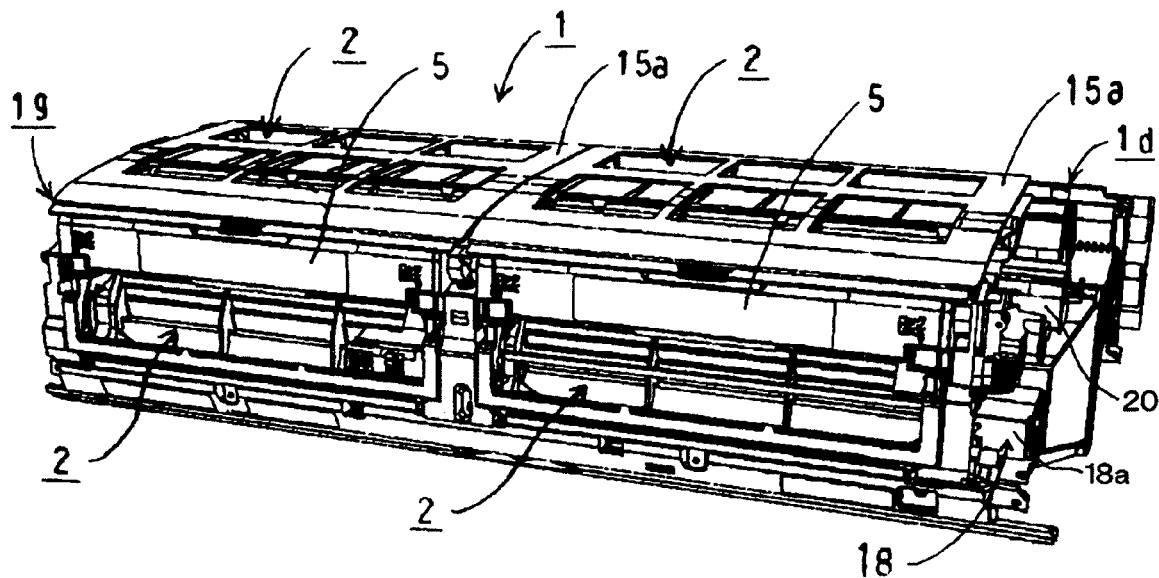
Figure 2B:
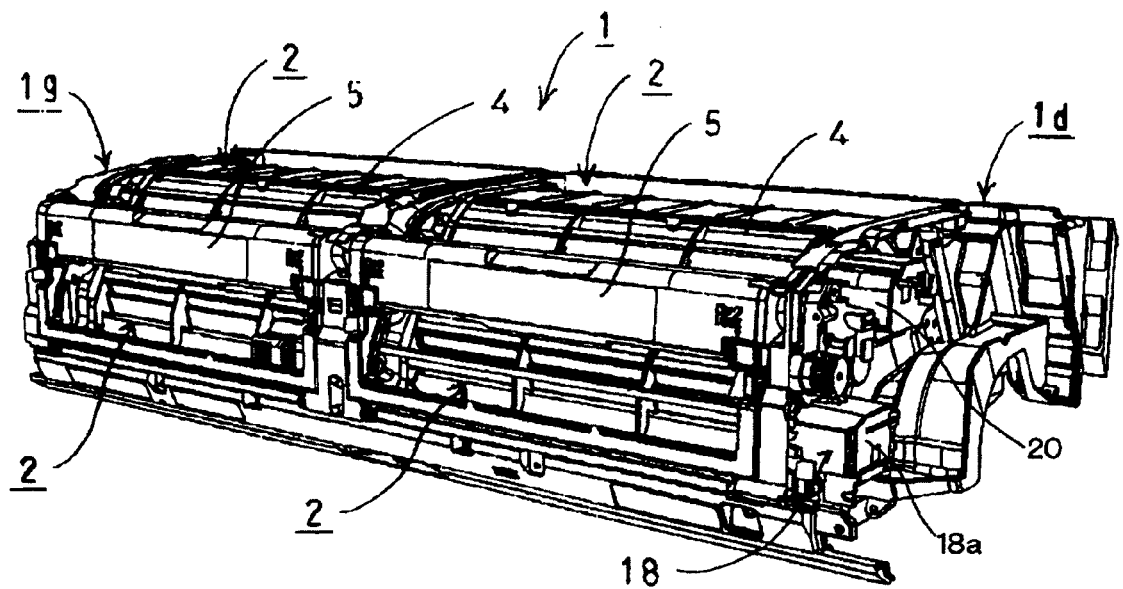
Figure 3A:
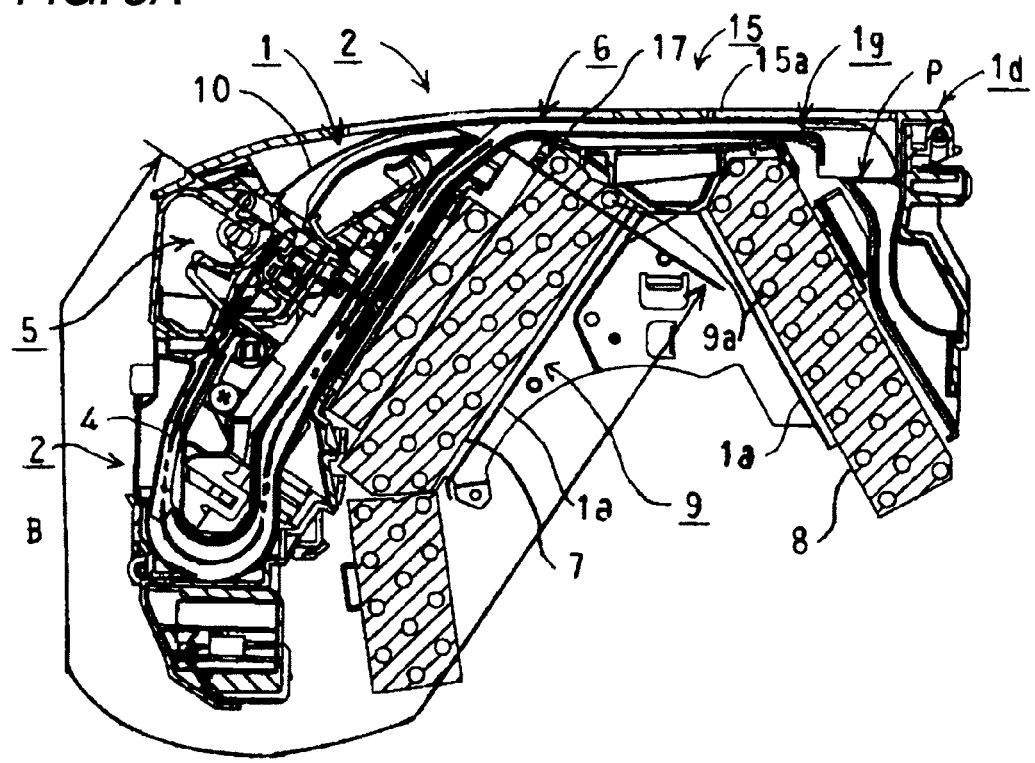
Figure 3B:
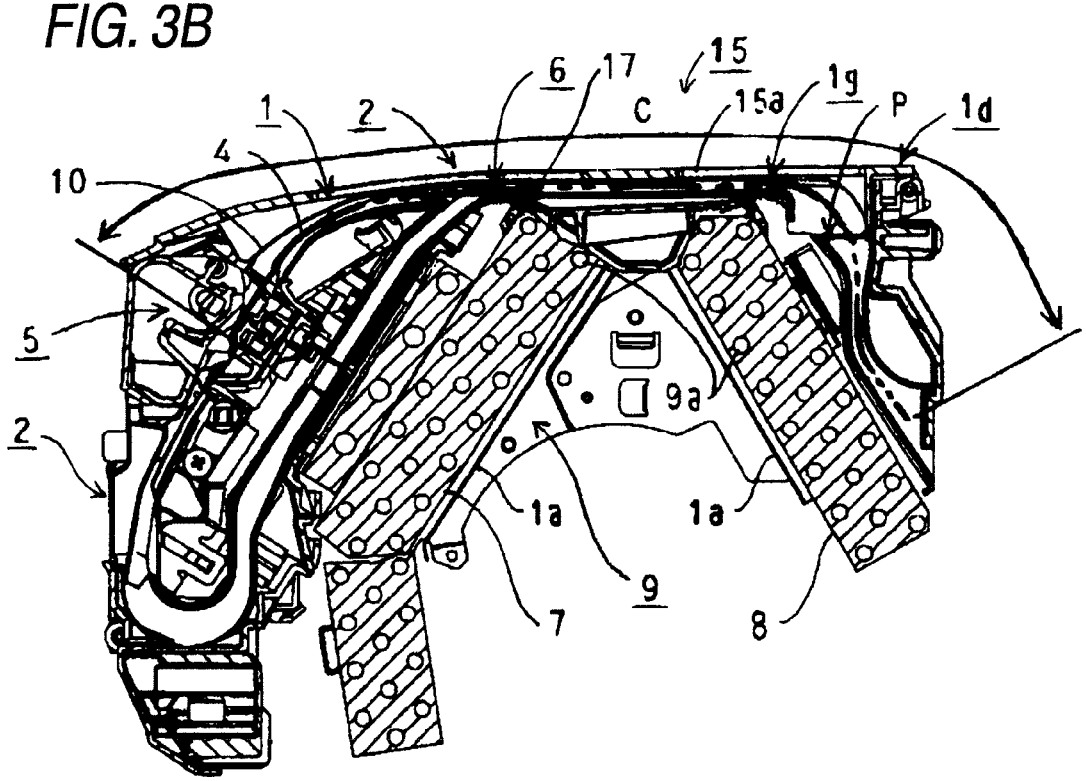
Figure 4A:
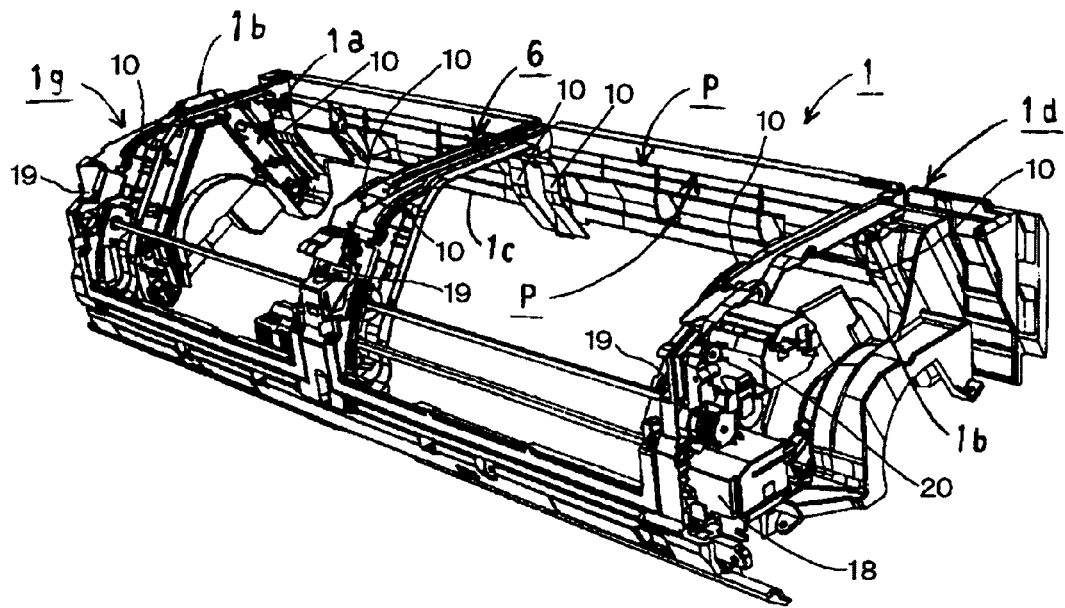
Figure 4B:
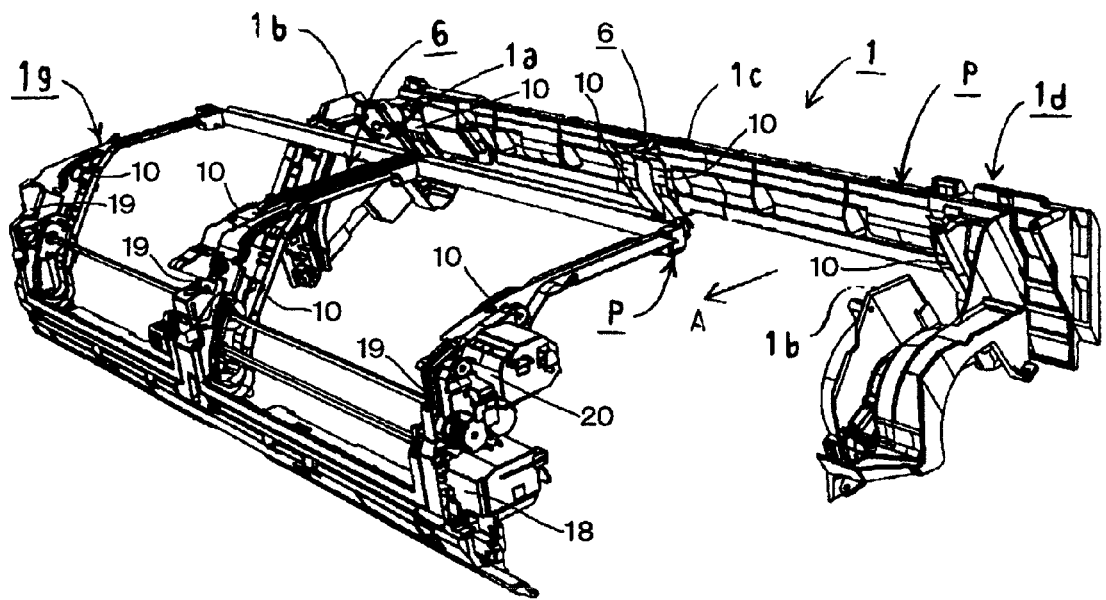

An embodiment of the present invention will be described in detail hereunder by reference to the accompanying drawings. FIGS. 1A and 1B are views showing an indoor unit of an air conditioner of the present invention. FIG. 1A is an external perspective view, and FIG. 1B is a cross-sectional view schematically showing an internal structure of the indoor unit. FIGS. 2A and 2B are views showing the indoor unit of the air conditioner of the present invention. FIG. 2A is a perspective view showing the indoor unit when a reclosable grill is removed, and FIG. 2B is a perspective view showing the indoor unit when the reclosable grill and an intake grill are removed. FIGS. 3A and 3B are descriptive views of the principle sections showing a position where a filter of the present invention is cleaned. FIG. 3A is a cross-sectional view showing the filter moved to a position in front of a heat exchanger, and FIG. 3B is a cross-sectional view showing the filter moved to a rear position. FIGS. 4A and 4B are descriptive views of the principle section of the indoor unit of the air conditioner of the present invention. FIG. 4A is a perspective view of a frame section consisting of a front frame and a rear frame, and FIG. 4B is a perspective view showing that the front frame is removed from the rear frame.

Figure 5:
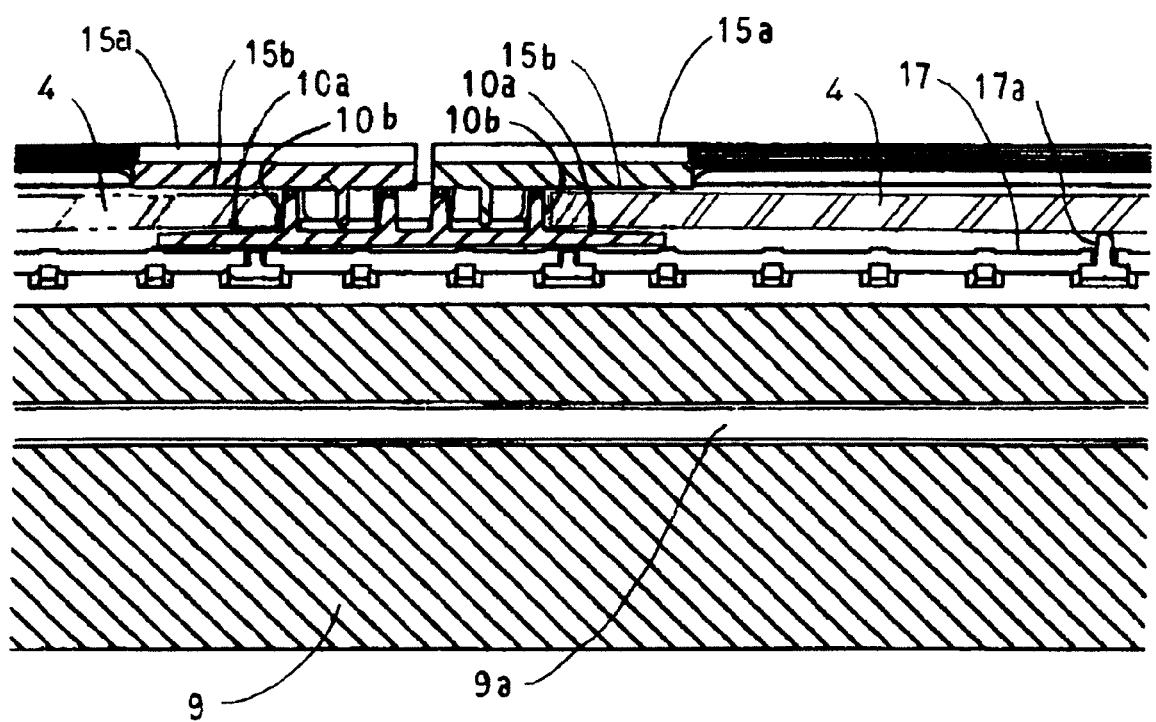
FIG. 5 is a cross-sectional view taken along line A-A shown in FIG. 1A.
Figure 6:
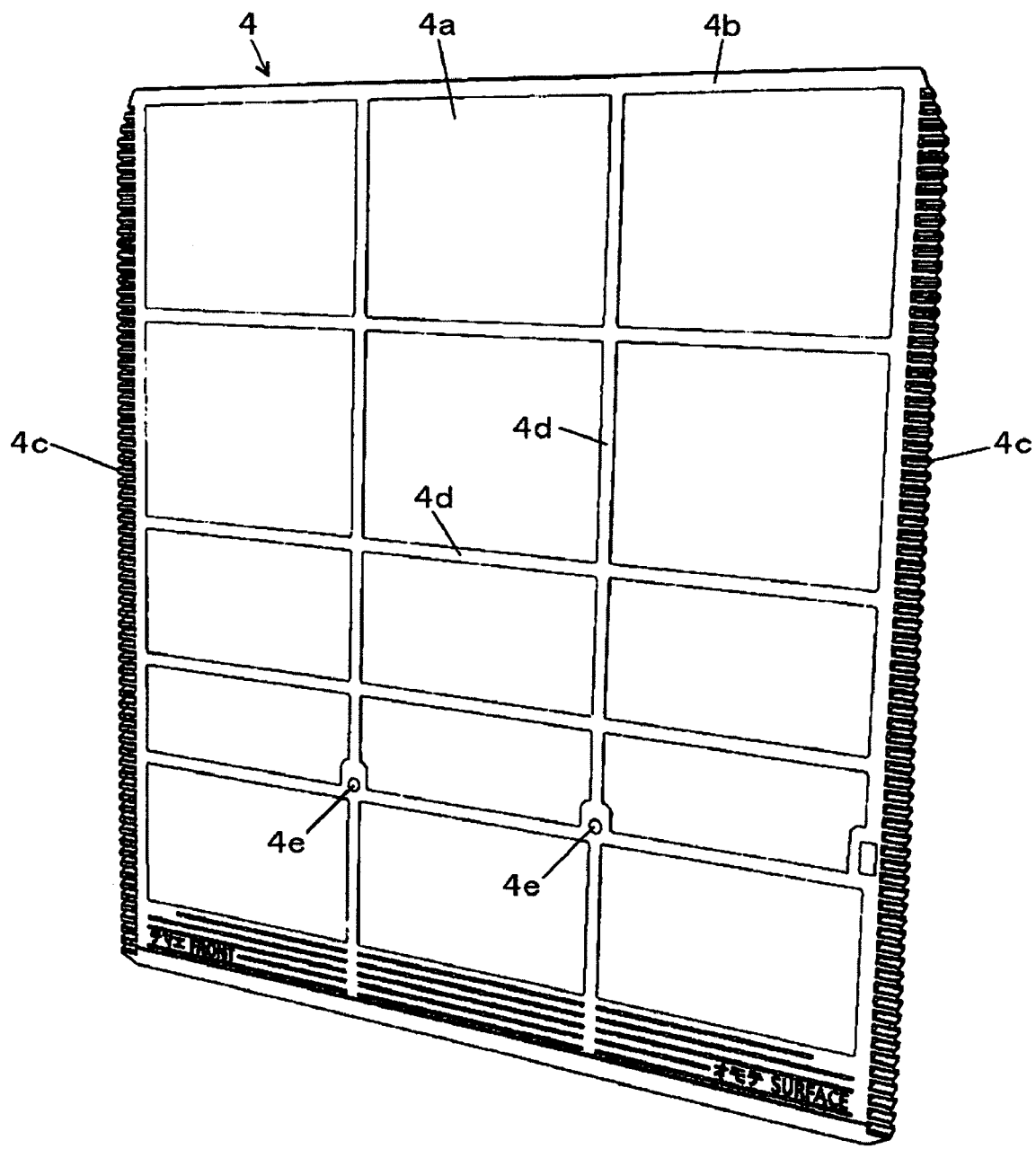
FIG. 6 is an external perspective view diagrammatically showing the filter shown in FIGS. 1B and 3.
Figure 7:
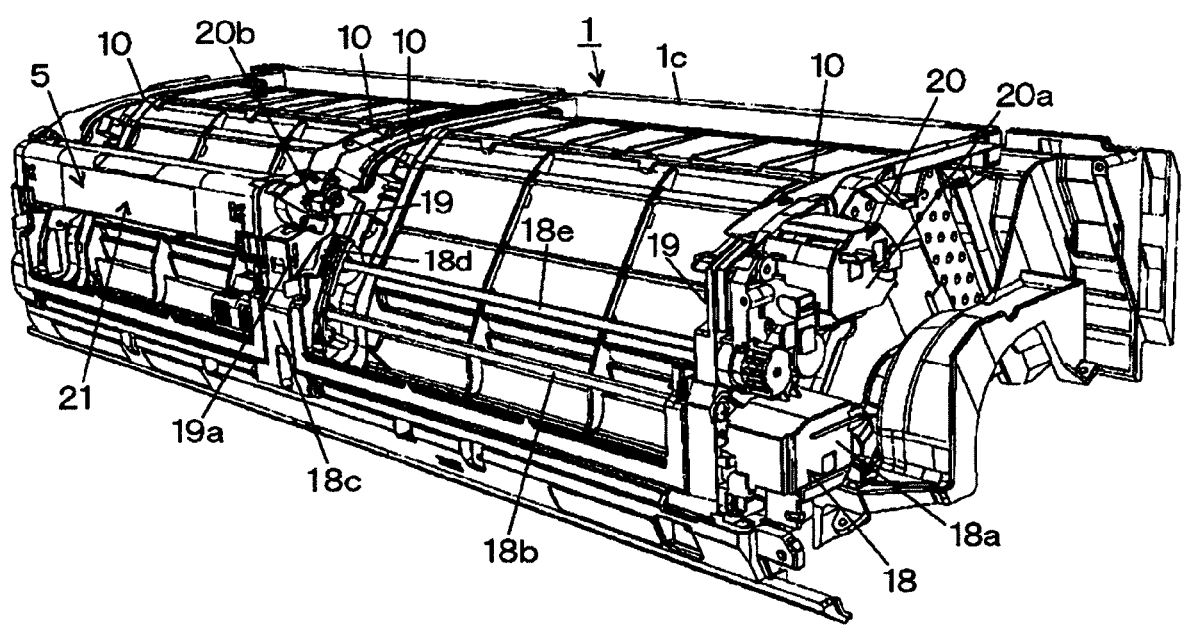
FIG. 7 is a perspective view showing a right-side cleaning unit shown in FIG. 2B in a removed state.
Figure 8:
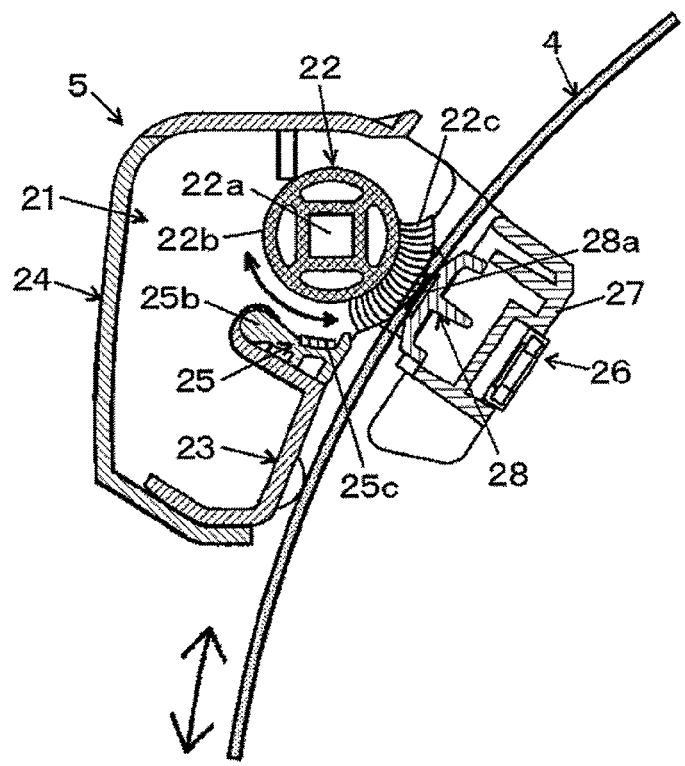
FIG. 8 is a cross-sectional view schematically showing the internal structure of the cleaning unit of the present invention and a cleaning state of a filter.
Figure 9:
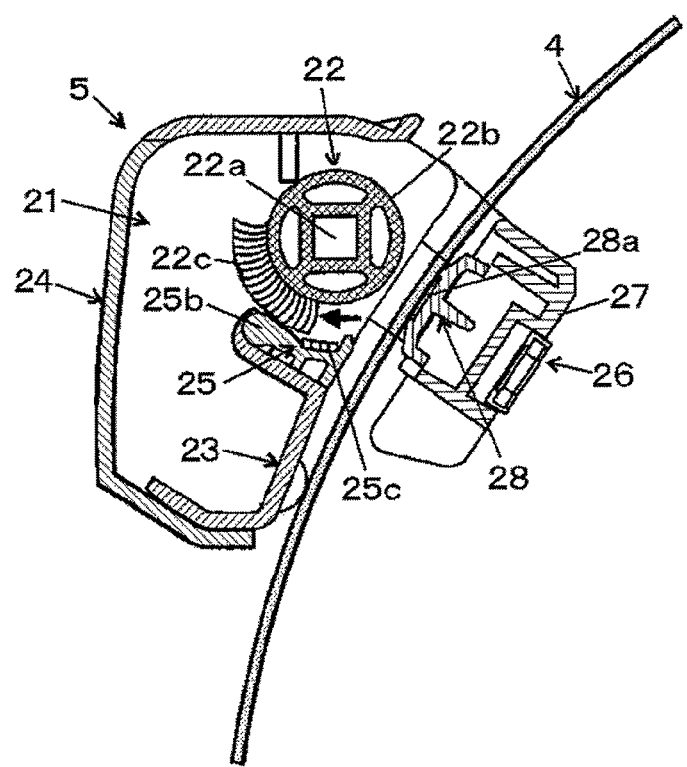
FIG. 9 is a cross-sectional view schematically showing the internal structure of the cleaning unit of the present invention and a non-cleaning state of the filter.
Figure 10:
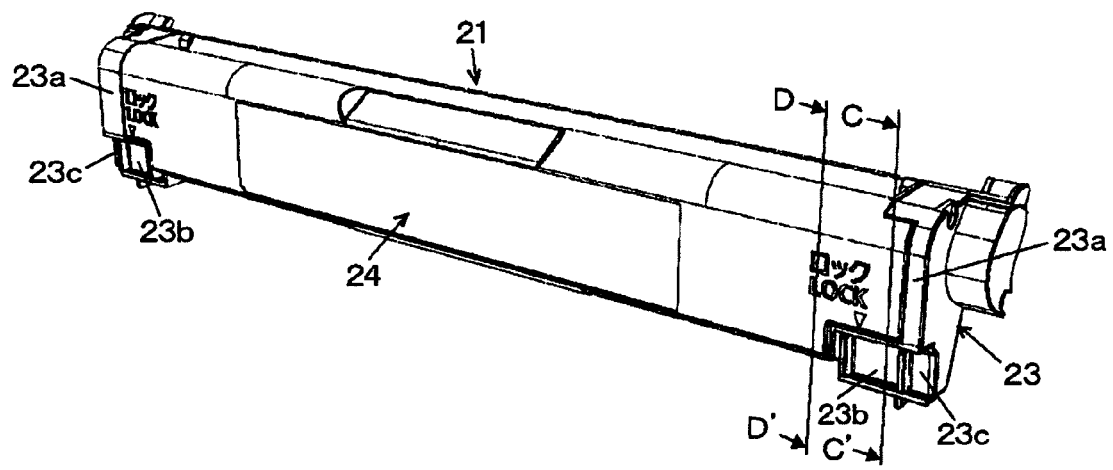
FIG. 10 is a perspective view showing a closed state of a reclosable cover of a dust box of the cleaning unit of the present invention.
Figure 11:
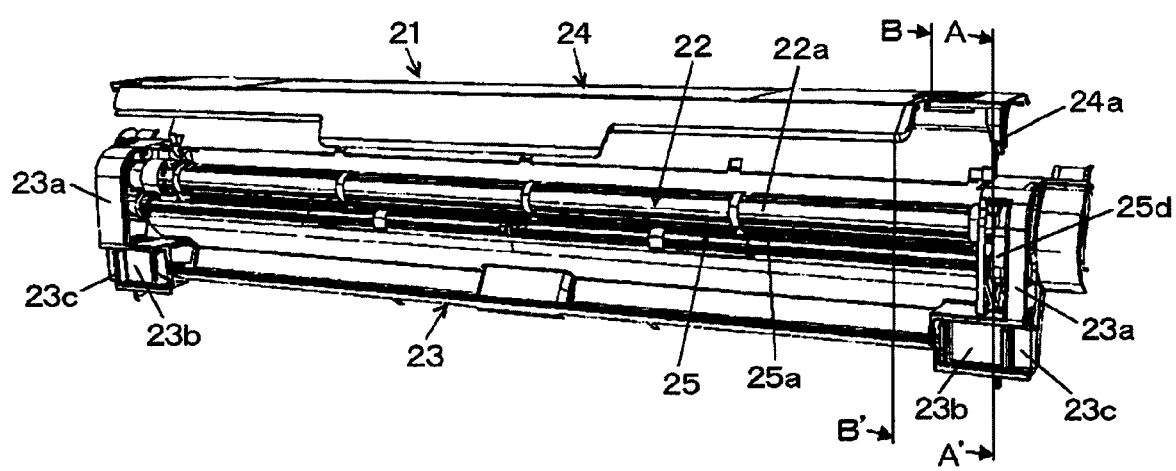
FIG. 11 is a perspective view showing an open state of the reclosable cover of the dust box of the cleaning unit of the present invention.
Figure 12:
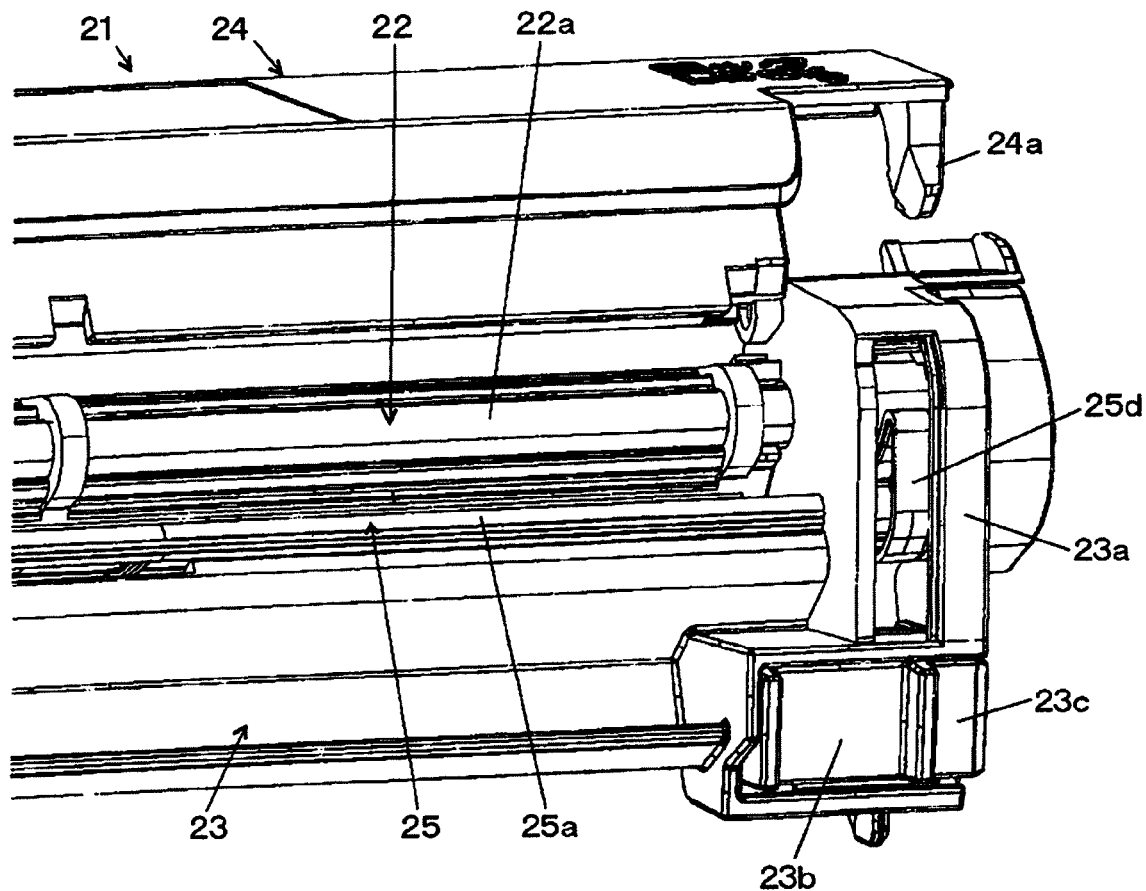
FIG. 12 is a perspective view showing a partially-enlarged state of the dust box shown in FIG. 10.
Figure 13:
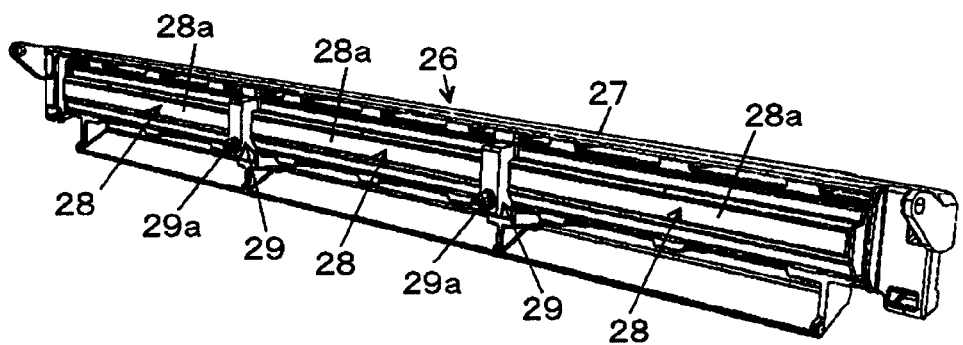
FIG. 13 is a perspective view showing a filter hold plate of the cleaning unit of the present invention.

FIG. 5 is a cross-sectional view taken along line A-A shown in FIG. 1A, and FIG. 6 is an external perspective view diagrammatically showing the filter shown in FIGS. 1B and 3. FIG. 7 is a perspective view showing a right-side cleaning unit shown in FIG. 2B in a removed state. FIG. 8 is a cross-sectional view schematically showing the internal structure of the cleaning unit of the present invention and a cleaning state of a filter. FIG. 9 is a cross-sectional view schematically showing the internal structure of the cleaning unit of the present invention and a non-cleaning state of the filter. FIG. 10 is a perspective view showing a closed state of a reclosable cover of a dust box of the cleaning unit of the present invention. FIG. 11 is a perspective view showing an open state of the reclosable cover of the dust box of the cleaning unit of the present invention. FIG. 12 is a perspective view showing a partially-enlarged state of the dust box shown in FIG. 11. FIG. 13 is a perspective view showing a filter hold plate of the cleaning unit of the present invention.

Figure 14A:
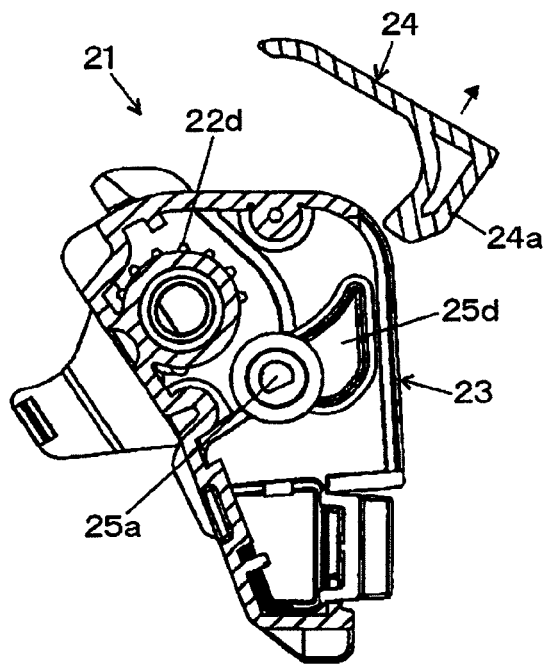
Figure 14B:
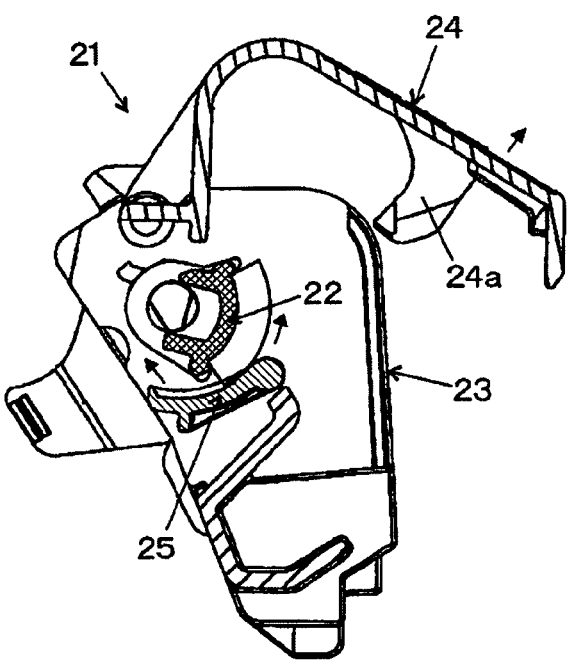
Figure 15:
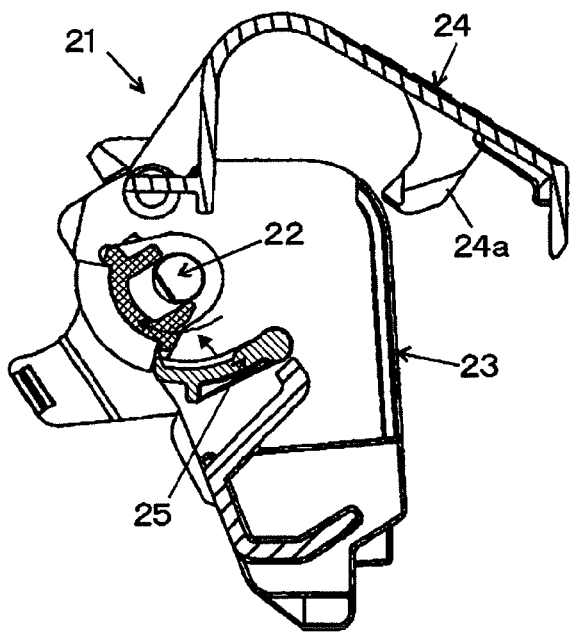
FIG. 15 is a cross-sectional view showing an open state of the reclosable cover of the dust box of the cleaning unit of the present invention and cleaner that is taken out of the dust box at the time of internal cleaning performed by the user.
Figure 16A:
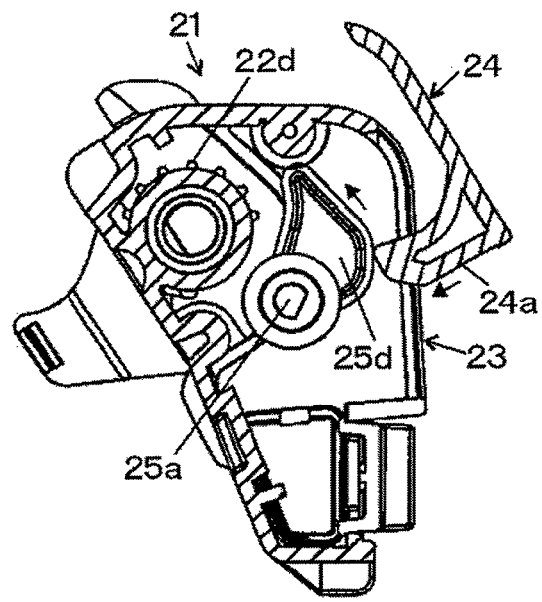
Figure 16B:
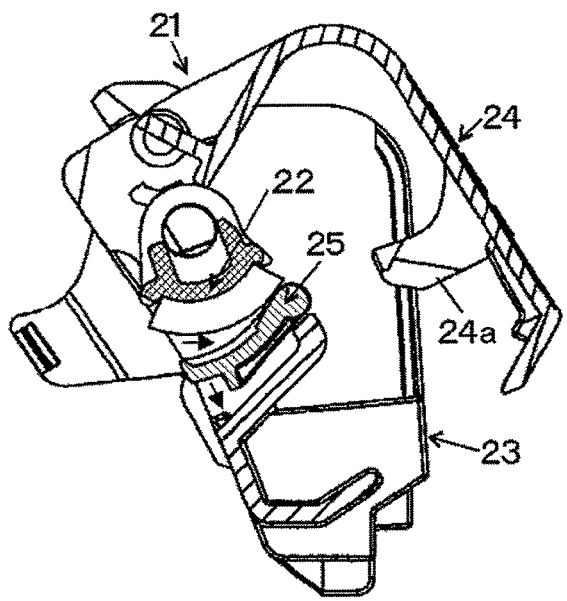
Figure 17A:
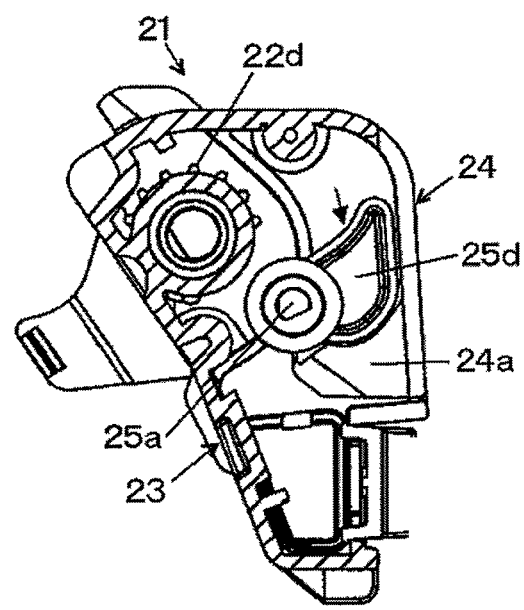
Figure 17B:
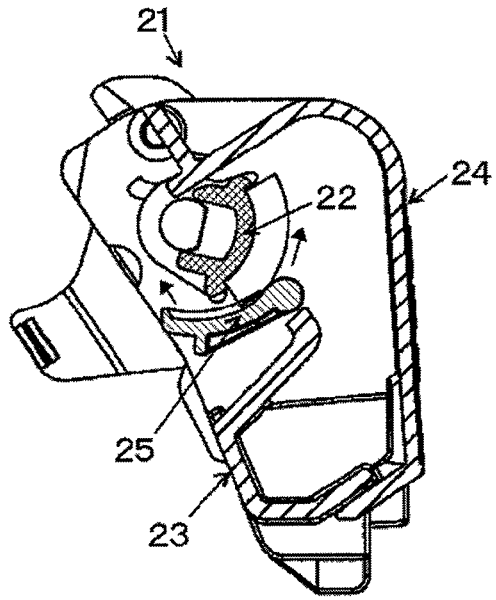
Figure 18:
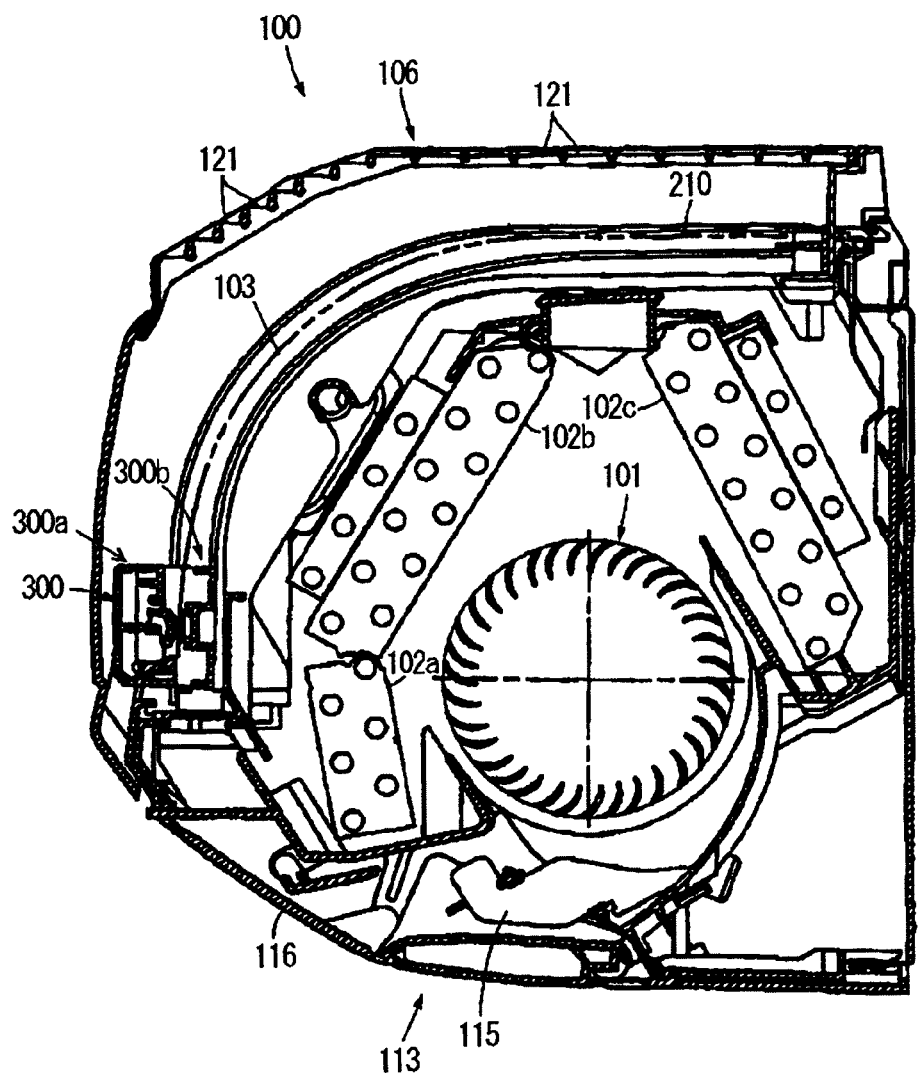
FIG. 18 is a cross-sectional view schematically showing the internal structure of an indoor unit of a related-art air conditioner.
Figure 19:
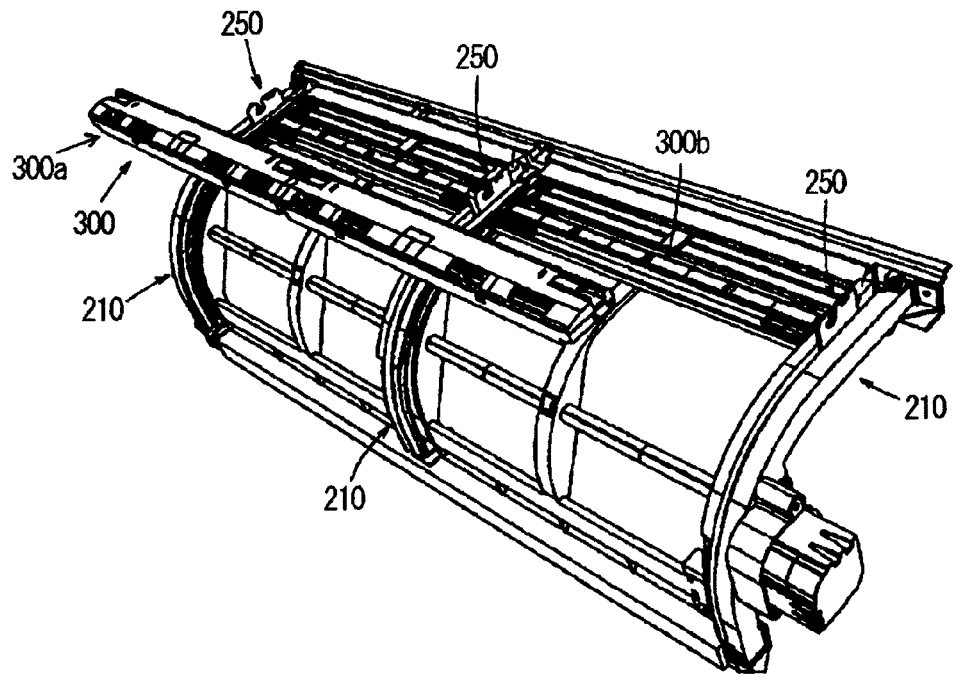
FIG. 19 is an exploded perspective view showing a state where a guide frame and a dust box of the indoor unit of the related-art air conditioner are exploded.
Figure 20:
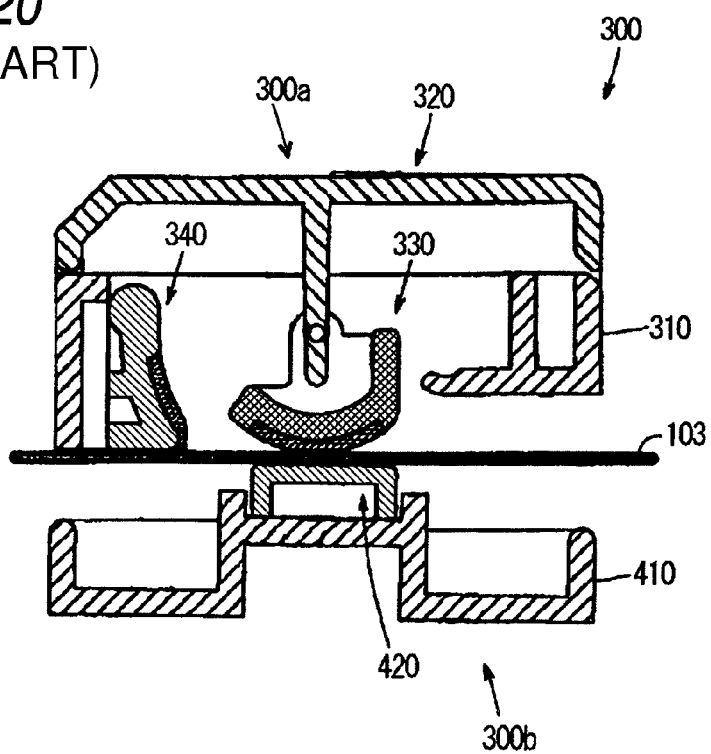
FIG. 20 is a cross-sectional view schematically showing the internal structure of a related-art cleaning unit.

FIGS. 14A and 14B are cross-sectional views showing an open state of the reclosable cover of the dust box of the cleaning unit of the present invention. FIG. 14A is a cross-sectional view taken along line A-A' shown in FIG. 11, and FIG. 14B is a cross-sectional view taken along line B-B' shown in FIG. 11. FIG. 15 is a cross-sectional view showing an open state of the reclosable cover of the dust box of the cleaning unit of the present invention and cleaner that is taken out of the dust box at the time of internal cleaning performed by the user. FIGS. 16A and 16B are cross-sectional views showing a process of the cleaner returning to the inside of the dust box after the user has conducted internal cleaning while the reclosable cover of the dust box of the cleaning unit of the present invention is half closed. FIG. 16A is a cross-sectional view equivalent to a cross section A-A' shown in FIG. 11, and FIG. 16B is a cross-sectional view equivalent to a cross-section B-B' shown in FIG. 11. FIGS. 17A and 17B are cross-sectional views showing that the cleaner fully enters the dust box after the user has conducted internal cleaning while the reclosable cover of the dust box of the cleaning unit of the present invention is closed. FIG. 17A is a cross-sectional view taken along line C-C' shown in FIG. 10, and FIG. 17B is a cross-sectional view taken along line D-D' shown in FIG. 10.

An embodiment of the air conditioner of the present invention and the cleaning unit provided in the air conditioner will be described hereunder. The basic structure of the indoor unit of the air conditioner of the present invention will be described by reference to FIGS. 1 through 6. As shown in FIGS. 1A through 4B, a frame section 1 provided in a casing 15 whose upper surface has an intake grill 15a includes a rear frame 1d made up of right and left support plates 1b having a support 1a for supporting both sides of a heat exchanger 9 and a joint plate 1c for joining the support plates 1b with each other; a base 1f made by joining a blow casing 1e to a lower portion of the rear frame 1d; and a front frame 1g attached to a front portion of the rear frame 1d so as to able to perform contacting and separating actions in a contact-and-separation section P.

In an air channel connecting the inlets 2 opened in the upper surface and the front surface of the front fame 1g with an outlet 3 opened in the front end of the blow casing 1e, there are provided plate-like filters 4 arranged along interior surface sides of the inlets 2; the heat exchanger 9 that is built from a front heat exchanger 7 and a rear heat exchanger 8 so as to assume an inverted-V-shaped cross section and that includes a plurality of fins parallelly arranged at uniform intervals and heat transfer pipes 9a crossing the fins at right angles; and a blow fan 11.

As can be seen from an open position of a reclosable grill 16a provided in a front panel 16 indicated by a two-dot chain line in FIG. 1B, the inlets 2 formed in the front surface of the front frame 1g are opened by turning the reclosable grill 16a as indicated by an arrow, whereupon an air in a room to be air-conditioned is taken in simultaneously with intake of an air through the inlets 2 provided in the upper surface of the front frame 1g.

The air drawn in by way of the inlets 2 is purified as a result of dust contained in the thus-drawn air being caught by the filters 4, subsequently subjected to heat exchange in the heat exchanger 9, and sent to the outlet 3 by means of the blow fan 11.

Right and left wind direction plates 12 for deflecting the direction of a wind in right and left directions and a diffuser 13 and up and down wind direction plates 14 for deflecting the direction of the wind in upper and lower directions are rotatably supported by the outlet 3.

As shown in FIG. 6, a net 4a for catching dust is stretched within a frame 4b of each of the filters 4, and each filter 4 has at both sides thereof racks 4c. Ribs 4d are formed within the frame 4b so as to divide the mesh 4a in a lattice pattern, and the mesh 4a, the frame 4b, the racks 4c, and the ribs 4d are integrally made of a synthetic resin.

Filter drive gears 18d that are provided on the front frame 1g as filter driver 18, which will be described later and are intended for moving the filters 4 and which are coupled to a filter drive motor 18a shown in FIGS. 2A and 2B, are engaged with the racks 4c. Each of the filters 4 is configured, at the time of cleaning operation, so as to move while passing through the cleaning unit 5 by means of the racks 4c meshing with the filter drive gear 18d driven by the filter drive motor 18a.

As shown in FIG. 1B, the cleaning unit 5 is disposed at an intermediate position between the front end and rear end of each of the filters 4. By means of a travel path 6 formed at a position of an area A shown in FIG. 1B in the front frame 1g along the interior surfaces of the inlets 2, each of the filters 4 can move in a space formed in front of the heat exchanger 7 and an area above the front heat exchanger 7 and the rear heat exchanger 8. Simultaneously, each of the filters 4 is held so as to be movable within a space formed behind the rear heat exchanger 8 by means of the travel path 6 formed in the rear frame 1*d*.

As will be described in detail later, the cleaning unit 5 is removably attached by means of a removal-and-attachment section 19 formed in the front frame 1*g*. As shown in FIGS. 8 and 9, the cleaning unit 5 has cleaner 22 for removing dust adhering to the filters 4 and reservoirs 23 for storing the dust removed by the cleaner 22. Further, as shown in FIGS. 4A and 4B, the front frame 1*g* has driver 20 (which will be called "cleaning brush driver" in the following descriptions) that drives the cleaner 22 (which will be called a "cleaning brush" in the following descriptions). At the time of cleaning of the filters 4, a cleaning brush 22 is turned by the cleaning brush driver 20 so as to contact the filters 4 and remove adhering dust. After the cleaning unit 5 is detached from the filters 4 at every predetermined cleaning operation time, the dust stored in the reservoirs 23 is taken out and discarded.

Each of the filters 4 is attached to the position of the area A shown in FIG. 1B, whereby the range of the front of the cleaning unit 5 opposes the inlets 2 opened in the front surface of the front frame 1*g*, and the range of the rear of the cleaning unit 5 opposes the inlets 2 opened in the upper surface of the front frame 1*g*.

The filters 4 exhibit flexibility. When cleaning the range of the rear of the cleaning unit 5, each of the filters 4 moves from its front end 4' along the travel path 6 that is formed in the front frame 1*g* in correspondence to the front and upper sides of the heat exchanger 9 and that is bent in the shape of the letter U from a position corresponding to the lower ends of the inlets 2 opened in the front surface of the front frame 1*g*, as indicated by a broken line shown in FIG. 1B.

At this time, each of the filters 4 moves to positions whose range is indicated by a double-headed arrow B shown in FIG. 3A while moving along the travel path 6 that is formed in the front frame 1*g* by being folded into the shape of the letter U.

As a result, a portion of the filter 4 falling within the range of the rear of the cleaning unit 5 is cleaned by the cleaning brush 22 provided in the cleaning unit 5, and removed dust is stored in the reservoirs 23.

Moreover, when cleaning the range of the rear of the cleaning unit 5, each of the filters 4 moves from its rear end 4" along the travel path 6 that is formed in the rear frame 1*d* in correspondence to the rear side of the heat exchanger 9 and that is downwardly bent from a position corresponding to the rear ends of the inlets 2 formed in the upper surface of the front frame 1*g*, as indicated by a broken line shown in FIG. 1B.

At this time, each of the filters 4 moves to positions whose range is designated by a double-headed arrow C shown in FIG. 3B while moving along the travel path 6 formed by being bent downwardly.

As a result, a portion of the filter 4 falling within the range of the front of the cleaning unit 5 is cleaned by the cleaning brush 22 provided in the cleaning unit 5, whereby the removed dust is stored in the reservoirs 23.

As shown in FIGS. 1B, 3A, and 3B, the travel path 6 is formed in the area of the rear frame 1*d* corresponding to the back of the rear heat exchanger 8 as well as in an area of the front frame 1*g* corresponding to the front of the heat exchanger 7 constituting the heat exchanger 9 and positions above the front heat exchanger 7 and the rear heat exchanger 8, so as to enable movement of the filters 4.

More specifically, a portion of the travel path 6 is constituted of guide member 10 that is provided in an area of the front frame 1*g* corresponding to the space formed in front of the front heat exchanger 7 and an area of the rear frame 1*d* corresponding to a space formed behind the rear heat exchanger 8 and that is formed so as to assume a C-shaped cross sectional profile.

The other portion of the travel path 6 is built from auxiliary guide member which is provided in a portion of the front frame 1*g* corresponding to areas above the front heat exchanger 7 and the rear heat exchanger 8 and which is formed from a bottom surface 10*a* and a side surface 10*b* so as to assume an L-shaped cross-sectional profile, as shown in FIG. 5, and a rear surface 15*b* of an inlet grill 15*a* opposing a bottom surface 10*a* constituting the auxiliary guide member.

The travel path 6 is formed in a split manner such that the guide member 10 provided in a portion of the rear frame 1*d* corresponding to the space formed behind the rear heat exchanger 8 is made so as to become continual to the guide member 10 in the portion of the front frame 1*g* corresponding to the space formed in front of the front heat exchanger 7 and becomes able to contact and depart from, in the contact-and-separation section P, the auxiliary guide member that is built from the bottom surface 10*a* and the side surfaces 10*b* located above the front heat exchanger 7 and the rear heat exchanger 8. The front frame 1*g*, which is forwardly removable as indicated by arrow A shown in FIG. 4B, is removably attached to the rear frame 1*d* that is joined to the upper portion of the blow casing 1*c* and that constitutes the base 1*f*.

Thereby, at the time of, for instance, forward removal of the front frame 1*g* having the travel path 6, the front frame 1*g* can be removed by being lifted upwardly by an amount corresponding to the height H indicated by FIG. 1B such that the contact-and-separation section P on the front frame 1*g* passes above a protrusion 17*a* projectingly provided on a filter guide 17 that is disposed on an upper end of the heat exchanger 9 and that is shown in FIG. 5.

Auxiliary guide member that is made up of the bottom surface 10*a* and the side surfaces 10*b* for guiding the filter 4 and that assumes an L-shaped cross-sectional profile are provided in a lower portion of the inlet grill 15*a* corresponding to the inlets 2 formed in the upper surface of the front frame 1*g*. Lower surfaces and edges on both sides of the filter 4, which are indicated by a two-dot chain line in FIG. 5, can be moved while being smoothly guided along the auxiliary guide member.

At that time, as shown in FIG. 5, upper surfaces on both sides of the filter 4 can be moved, while being smoothly guided, along the rear surface 15*b* of the inlet grill 15*a* opposing the bottom surface 10*a* of the auxiliary guide member.

Both sides of the filter 4 located below the inlet grill 15*a* corresponding to the inlets 2 opened in the upper surface of the front frame 1*g* are held such that the auxiliary guide member and the rear surface 15*b* of the inlet grill 15*a* enable smooth sliding of both sides. In particular, since the inlet grill 15*a* doubles also as means for guiding the upper surfaces on both sides of the filter 4, the essential requirement is to form the inlet grill as auxiliary guide member that is made up of a bottom surface 10*a* and side surfaces 10*b* and that assumes an L-shaped cross section, and there is no necessity for forming the grill as the guide member 10 assuming the shape of the letter C.

When formed so as to assume; for instance, a C-shaped cross sectional profile, the auxiliary guide member is configured such that the inlet grill 15*a* is superimposed on an upper surface portion of the auxiliary guide member assuming the C-shaped cross section. However, as a result of the auxiliary guide member being formed so as to assume an L-shaped cross section, the size of the indoor unit of the air conditioner can be reduced by about three meters equivalent to the thickness of the upper surface portion, to thus attain a reduction in height and weight. Further, the indoor unit can be configured so as to enable a reduction in the amount of material (a synthetic resin) equivalent to the thickness of the upper surface portion assuming the C-shaped cross section.

The inlet grill 15a can be imparted with sufficient strength without adoption of a configuration where auxiliary guide member is formed into the shape of the letter C and the inlet grill 15a is superimposed on an upper surface portion assuming a C-shaped cross section, and hence there is no potential of the inlet grill becoming deficient in strength.

By reference to FIGS. 4A, 4B, and 7, details of the filter driver 18 and the cleaning brush driver 20 will be described in connection with the guide member 10. The filter driver 18 is disposed inside of the guide member 10 provided on the portion of the front frame 1g corresponding to the space formed in front of the front heat exchanger 7, thereby enabling front-and-back reciprocal movement of each of the filters 4. The removal-and-attachment section 19 that partitions the travel path 6 and where the cleaning unit 5 is removed or attached is formed at an arbitrary position along the travel path 6 for the guide member 10 provided on the front frame 1g. The filters 4 are arranged so as to pass the cleaning unit 5 as a portion of the travel path 6. Moreover, the cleaning brush driver 20 is disposed outside of the guide member 10 provided on the portion of the front frame 1g corresponding to the space formed in front of the front heat exchanger 7, to thus enable turning of the cleaning brush 22.

The filter driver 18 is disposed in the guide member 10 and at a position opposing the front panel 16. The filter driver 18 has a filter drive motor 18a serving as a drive source; a first rotary shaft 18b to which rotational drive force of the filter drive motor 18a is transmitted; a clutch mechanism 18c that is rotated when linked to the first rotary shaft 18b; a filter drive gear 18d that is rotated when linked to the clutch mechanism 18c; and a second rotary shaft 18e to which rotational drive force of the filter drive gear 18d is transmitted.

The filter drive gear 18d is provided in the respective guide member 10 provided on the right and left sides of the front frame 1g as well as in the respective guide member 10 located in the center where the clutch mechanism 18c is disposed. The second rotary shaft 18e is provided so as to extend between the right guide member 10 located in the center where the clutch mechanism 18c is disposed and the guide member 10 provided on the right side of the front frame 1g. The second rotary shaft 18e is also provided so as to extend between the left guide member 10 located in the center where the clutch mechanism 18c is disposed and the guide member 10 positioned on the left side of the front frame 1g.

By the thus-configured filter driver 18, the filter drive gear 18d is engaged with the racks 4c formed on the filter 4, whereby the filter 4 can be moved front and back by means of rotation of the filter drive gear 18d. When the filter 4 is moved front and back, the clutch mechanism 18c performs switching such that rotational drive force of the filter drive gear 18d is transmitted to either the right-side second rotary shaft 18e or the left-side second rotary shaft 18e. By means of operation of the clutch mechanism 18c, the rotational drive force of the filter drive motor 18a is transmitted to either the right-side second rotary shaft 18e or the left-side second rotary shaft 18e byway of the first rotary shaft 18b, whereupon the filter 4 covering a right half of the heat exchanger 9 and the filter 4 covering a left half of the same can be alternately moved.

In the meantime, the cleaning brush driver 20 is placed outside of the guide member 10 and at a position opposing the front panel 16. The cleaning brush driver 20 has a cleaning brush drive motor 20a serving as a drive source; an unillustrated third rotary shaft to which the rotational drive force of the cleaning brush drive motor 20a is transmitted; a cleaning brush drive gear 20b that is rotated when linked to the third rotary shaft; an unillustrated drive transmission mechanism that is rotated when linked to the cleaning brush drive gear 20b; and an unillustrated fourth rotary shaft to which rotational drive force of the drive transmission mechanism is transmitted.

The cleaning brush drive gear 20b is disposed outside of the respective guide member 10 that are provided with the removal-and-attachment section 19 and that are located on the right and left portions of the front frame 1g as well as outside of the respective guide member 10 that are provided with the removal-and-attachment section 19 where the cleaning unit 5 is removed or attached and that are located in the center of the front frame 1g. The third rotary shaft is provided so as to extend between the outside of the right guide member 10 located in the center and the outside of the guide member 10 located on a right portion of the front frame 1g. Further, the fourth rotary shaft is provided so as to extend between the outside of the left guide member 10 located in the center and the outside of the guide member 10 located on a left portion of the front frame 1g.

By the thus-configured cleaning brush driver 20, the cleaning brush drive gear 20b is engaged with a cleaning brush driven gear 22d linked to the rotary shaft of a cleaning brush 22 to be described later, so that the cleaning brush 22 can be turned by means of turning action of the cleaning brush drive gear 20b. At the time of turning of the cleaning brush 22, the rotational drive force of the cleaning brush drive motor 20a is transmitted from the third rotary shaft to the fourth rotary shaft by way of the drive transmission mechanism. By way of the cleaning brush drive gear 20b linked to the third rotary shaft and the fourth rotary shaft, the cleaning brush 22 can be brought into contact with the surface of a portion of the filter 4 covering the right half of the heat exchanger 9 and the surface of a portion of the filter 4 covering the left half of the same, and the cleaning brush 22 can be housed in the cleaning unit 5.

The basic structure of the cleaning unit 5 of the present invention will now be described by reference to FIGS. 8 through 13. As shown in FIGS. 2A, 2B, and 7, the cleaning units 5 are attached to the removal-and-attachment section 19; namely, one for the filter 4 covering the right half of the heat exchanger 9 and the other for the filter 4 covering the left half of the same. However, the cleaning units 5 have the same configuration, and hence only one of the cleaning units 5 is described hereunder.

As shown in FIGS. 8 through 13, the cleaning unit 5 is equipped with a dust box 21 and a filter hold plate 26. The dust box 21 has the cleaning brush 22 for removing the dust caught by the filter 4; the reservoirs 23 for storing the thus-removed dust; a reclosable cover 24 that is reclosably attached and that covers an opening in the front surfaces of the reservoirs 23; and dust collector 25 (which will be cased a "dust collection brush" in the following descriptions) that collects the dust removed by the cleaning brush 22 in the reservoirs 23. As shown in FIG. 7, the entire dust box 21 is formed into an essentially-rectangular shape so as to be passed to the removal-and-attachment section 19 provided on the front frame 1g.

The cleaning brush 22 has a cleaning brush housing 22b supported so as to be rotatable around a predetermined horizontal rotary shaft 22a, and a cleaning brush main unit 22c is provided on a brush surface of the cleaning brush housing 22b. The cleaning brush housing 22b is formed into an essentially-cylindrical shape that is supported by support sections 23b provided on both sides of the respective reservoirs 23 in a rotatable manner, and a brush surface of the cleaning brush housing opposing the filter 4 is formed into a circular-arc surface. The cleaning brush driven gears 22d for forcefully rotating the cleaning brush housing 22b are provided on both longitudinal side surfaces of the cleaning brush housing 22b by way of the horizontal rotary shaft 22a (see FIG. 14A). The cleaning brush main body 22c is made from a lissothricic brush that is formed by implanting a brush hair at essentially right angles to an unillustrated sheet-shaped base material, and the brush is affixed integrally to the brush surface by way of an adhesive material. The horizontal rotary shaft 22a is equipped with an unillustrated spring member for urging the horizontal rotary shaft in a clockwise direction in FIG. 8 by means of a spring.

An essentially-entire front surface of each of the reservoirs 23 is opened, and an upper half of a rear surface of each of the reservoirs is opened. A box portion is provided in a lower half of the reservoir. A dust collection brush 25 for collecting the dust removed by the cleaning brush 22 is provided on a side surface at which the opening of the upper half rear surface and the box are partitioned from each other.

The dust collection brush 25 has a collection brush housing 25b that is supported so as to be rotatable around a predetermined horizontal rotary shaft 25a, and a collection brush main body 25c is provided integrally on the collection brush housing 25b. As shown in FIG. 8, the collection brush housing 25b is formed so as to assume a circular-arc cross section, and the collection brush main body 25c is provided on the brush surface formed into the shape of a circular-arc plane along the locus of rotation of the cleaning brush 22. The collection brush main body 25c is formed from an inclined brush in which an unillustrated brush hair is implanted in an inclined manner. In FIG. 8, the inclined brush is provided so as to face an oblique upper left direction. In the present embodiment, an unillustrated spring member is mounted on the horizontal rotary shaft 25a of the collection brush housing 25b. The dust collection brush 25 is urged, by a spring, toward the cleaning brush 22 at all times so as to contact the brush at uniform force.

As a result of this, the dust collection brush 25 contacts the cleaning brush 22 in an oblique direction by turning the cleaning brush 22 toward the dust collection brush 25, and hence the dust removed by the cleaning brush 22 can be collected without fail by the dust collection brush 25. In FIG. 8, although the dust collection brush 25 is urged by means of a spring in a counterclockwise direction, the cleaning brush 22 is brought out of contact with the dust collection brush 25 when given force or greater is exerted on the collection brush housing 25b against the spring force, whereby the cleaning brush 22 can be returned to the original position by clockwise urging action of the spring. As shown in FIGS. 10 and 11, foregoing operation is realized by a lever 25d coupled to the horizontal rotary shaft 25a within a support section 23a that is provided on a right surface of the collection brush housing 25b in its longitudinal direction and that is provided on the right side of the reservoir 23. Although detailed operation will be described later, the lever 25d is for bringing the dust collection brush 25 out of contact with the cleaning brush 22 by forcefully applying force to the collection brush housing 25b against spring force.

As shown in FIGS. 10 and 11, the reclosable cover 24 covers the front surfaces of the reservoirs 23 and is formed so as to assume an essentially-C-shaped cross section. The reclosable cover 24 is attached to the reservoirs 23 so as to be reclosable around an unillustrated horizontal rotary shaft attached to one end, whereby the reclosable cover 24 can be fastened to the reservoirs 23. An integrally-molded arm 24a is provided on the reclosable cover 24 so as to oppose a lever 25d joined integrally to a horizontal rotary shaft 25a of the collection brush housing 25b. Although detailed operation will be described later, the arm 24a is for pressing the lever 25d when the reclosable cover 24 is closed.

A lock section 23b for attaching the dust box 21 to the removal-and-attachment section 19 provided on the front frame 1g and fixing the dust box to the front frame 1g, is provided at each of lower ends of support sections 23a of the respective right and left reservoirs 23 located on both sides of the reclosable cover 24. Each of the lock sections 23b is formed by making a dent in a part of the reservoir 23 and provided in a slidable manner. As shown in FIG. 7, a latch claw 23c provided at an extremity of the lock section 23b is inserted into an insert hole 19a formed in the removal-and-attachment section 19 provided on the front frame 1g.

The filter hold plate 26 of the cleaning unit 5 will now be described. As shown in FIGS. 8 and 13, the filter hold plate 26 has a base plate 27 rotatably attached to the dust box 21; a hold plate main body 28 that is attached integrally to the base plate 27 and that holds a rear surface side of the filter 4; and a positioning member 29 that is attached to the base plate 27 so as to longitudinally partition the hold plate main body 28 and that holds the rear surface side of the filter 4, to thus position the filter 4.

The surface side of the base plate 27 is longitudinally partitioned into three sub-sections, and a dent is made in the respective sub-sections, and the three hold plate main bodies 28 are attached to the respective dents. Each of the hold plate main bodies 28 has a hold surface 28a that contacts the rear surface of the filter 4, and the respective hold surfaces 28a are disposed opposite the cleaning brush 22 provided in the dust box 21 and correspond to smooth surfaces for holding the filter 4 pressed by the cleaning brush 22. The two positioning members 29 forced toward the front surface side by springs are attached to the base plate 27 at respective positions among the hold plate main bodies 28. Each of the positioning members 29 has a projection 29a to be inserted into the insert hole 4e formed in the rib 4d of the filter 4, shown in FIG. 6, whose explanations are omitted from the above descriptions and determines a positional relationship between the filter 4 and the filter hold plate 26.

As shown in FIGS. 2A, 2B, 7, and 8, in the indoor unit of the air conditioner having the previously-described cleaning unit 5, the filters 4 are sandwiched between the dust box 21 and the filter hold plate 26 of the cleaning unit 5; the cleaning unit 5 is attached to the removal-and-attachment section 19 provided on the front frame 1g; and the filters 4 are arranged in the travel path 6 of the guide member 10.

In such a state, since the cleaning brush driven gears 22d of the cleaning brush 22 mesh with the cleaning brush drive gears 20b during cleaning of the filters 4, the cleaning brush driven gears 22d first receive the rotational drive force of the cleaning brush drive gears 20b, thereby rotating the cleaning brush 22. Hereby, the cleaning brush 22 is taken out of the dust box 21 and brought into contact with the filters 4. The cleaning brush 25 is forced by a spring in a counterclockwise direction and hence supported by the dust collection brush 25. Next, the racks 4c provided on both sides of the respective filters 4 mesh with the filter drive gears 18d, and hence the racks 4c receive the rotational drive force of the filter drive gears 18d, thereby reciprocally moving the filters 4 back and front within the travel path 6 with reference to the cleaning unit 5. Thereby, the cleaning brush 22 removes the dust adhering to the filters 4.

As shown in FIG. 9, when the filters 4 are not cleaned, reciprocal movement of the filters 4 is first stopped so as to come to the home position (the position falling within the range A indicated by the double-headed arrow shown in FIG. 1B). Immediately after having been stopped, the cleaning brush 22 is supported by the dust collection brush 25 while remaining in contact with the filter 4. Next, the cleaning brush driven gears 22d of the cleaning brush 22 receive the rotational drive force of the cleaning brush drive gears 20b, thereby rotating and bringing the cleaning brush 22 out of contact with the filter 4. The cleaning brush 22 is then put in the dust box 21. Since the cleaning brush 22 contacts, while rotating, the dust collection brush 25 at this time, the dust removed by the cleaning brush 22 is collected by the dust collection brush 25. When the filters 4 are not cleaned, the cleaning brush 22 stays in standby condition while being held in the dust box 21.

As shown in FIGS. 7 and 9, the cleaning unit 5 can be detached from the removal-and-attachment section 19 provided on the front frame 1g while holding the filter 4. Moreover, the dust box 21 of the cleaning unit 5 can be released from the filter hold plate 26, and hence only the dust box 21 can also be detached from the removal-and-attachment section 19 provided on the front frame 1g. When the detached cleaning unit 5 is attached to the removal-and-attachment section 19, the filter 4 is inserted from the front surface of the casing 15 between the guide member 10 constituting the travel path 6 for the filter 4, and a rear end of the filter 4 is guided to the guide member 10 along the upper panel 4. After a front end of the filter 4 has been guided to the guide member 10 along the front panel 16, the cleaning unit 5 can be attached to the removal-and-attachment section 19.

By reference to FIG. 12 and FIGS. 14 through 17, there is described mechanical operation of the dust box 21 that is performed when the inside of the dust box 21 of the cleaning unit 5 of the present invention is cleaned. First, FIG. 14 shows a state where only the dust box 21 is separated from the filter hold plate 26 of the cleaning unit 5 by removing the cleaning unit 5 from the removal-and-attachment section 19 provided on the front frame 1g. As shown in FIG. 12 or 14, the user opens the reclosable cover 24 of the dust box 21, whereby the reservoirs 23, the cleaning brush 22, and the like, are exposed outside the thus-separated dust box 21, and hence the inside of the dust box 21 can be cleaned.

In relation to the cleaning brush 22 and the dust collection brush 25, when the reclosable cover 24 of the dust box 21 remains open, the cleaning brush 22 is rotated by the cleaning brush driver 20 and housed in the dust box 21, as shown in FIG. 14B. Subsequently, the dust collection brush 25 and the cleaning brush 22 stay stationary at respective urging positions under the counterclockwise urging action of the spring exerted on the cleaning brush 22 and the clockwise urging action of the spring exerted on the dust collection brush 25. The lever 25d joined to the horizontal rotary shaft 25a of the dust collection brush 25 achieved when the dust collection brush 25 and the cleaning brush 22 stay stationary is halted at a position shown in FIG. 14A under the restoration of the spring exerted on the dust collection brush 25.

Next, FIG. 15 shows a state where, when the user wipes dust off the inside of the dust box 21 or washes the same in water, the cleaning brush 22 is rotated, to thus make the cleaning brush 22 exposed outside from the opening in the rear surface of the dust box 21. When the deep inside of the reservoirs 23 or the back of the cleaning brush 22 are cleaned every corner of the dust box, the cleaning brush 22 can be manually rotated in defiance of the counterclockwise urging action of the spring.

In relation to the cleaning brush 22 and the dust collection brush 25, in a state where the cleaning brush 22 remains exposed outside, the clockwise restoration of the spring exerted on the dust collection brush 25 is slightly greater than the counterclockwise restoration of the spring exerted on the cleaning brush 22, as shown in FIG. 15; hence, the dust collection brush 25 supports the cleaning brush 22. The urging actions of the springs may also be equal to each other, and the dust collection brush 25 and the cleaning brush 22 may also be balanced.

FIG. 16 shows a state where, after having cleaned the inside of the dust box 21, the user closed the reclosable cover 24 of the dust box 21 to an intermediate position. As shown in FIG. 16, the arm 24a provided on the reclosable cover 24 is arranged so as to press the lever 25d provided on the dust collection brush 25 as a result of the reclosable cover 24 of the dust box 21 being closed, and hence the cleaning brush 22 can be returned to the inside of the dust box 21.

In a state where the reclosable cover 24 of the dust box 21 is closed to an intermediate position, an extremity of the arm 24a provided on the reclosable cover 24 contacts a front surface of the lever 25d provided on the dust collection brush 25, as shown in FIG. 16A, and the lever 25d pressed by the extremity of the arm 24a rotates to a rear side of the upper portion of the dust box 21. When the lever 25d is turning to the rear surface of the upper portion of the dust box 21, the dust collection brush 25 is forcefully moved downwardly, by means of turning action of the lever 25d, against the clockwise urging action of the spring, as shown in FIG. 16B. Hereby, the dust collection brush 25 is brought out of contact with the cleaning brush 22, and hence the cleaning brush 22 is returned to the inside of the dust box 21 by turning action induced by the counterclockwise urging action of the spring.

Finally, FIGS. 17A and 17B show a state where the user has completely closed the reclosable cover 24 of the dust box 21. As shown in FIGS. 17A and 17B, the lever 25d provided on the dust collection brush 25 can be returned to the same position as that shown in FIG. 14A by completely closing the reclosable cover 24 of the dust box 21.

As shown in FIG. 17A, in a state where the reclosable cover 24 of the dust box 21 is completely closed, an extremity of the arm 24a provided on the reclosable cover 24 is moved downwardly within the dust box 21 and released from a press given by the lever 25d. By means of clockwise urging action of a spring, the lever 25d returns to the front side within the dust box 21. As shown in FIG. 17B, when the lever 25d returns to the front side within the dust box 21, the dust collection brush 25 has moved to an upper side by means of rotation of the lever 25d induced by urging action of a spring. By means of the counterclockwise urging action of the spring, the cleaning brush 22 has further turned in the direction of the opening formed in the front surface within the dust box 21.

In the air conditioner having the cleaning unit 5 of the present invention of the embodiment described above, there are provided the filters 4 for catching dust that are interposed between the inlets 2 and the heat exchanger 9, the cleaning unit 5 for removing the dust caught by the filters 4, and driver (the filter driver 18) for moving either the filter 4 or the cleaning unit 5. The cleaning unit 5 is equipped with the dust box 21 having the cleaner (the cleaning brush 22) for removing the dust caught on the surface of the filters 4. The air conditioner is provided with driver (the cleaning brush driver 20) that drives cleaner for drawing the cleaner out of the dust box 21 and bringing the thus-drawn cleaner into contact with the filters 4 at the time of cleaning of the filters 4 and bringing the cleaner out of contact with the filters 4 and putting the cleaner in the dust box 21 when the filters 4 are not cleaned. By means of the driver, when the filters 4 are not cleaned, the cleaner are separated from the filters 4 and placed in the dust box 21 at all times. Hence, deformation of the brush of the cleaner and a deterioration of dust removal capability of the cleaner achieved during cleaning of the filters 4 are prevented, and the filters 4 can be cleaned properly.

In relation to the cleaning unit 5, the dust box 21 is removably positioned with respect to the frame 1 (the removal-and-attachment section 19 provided on the front frame 1g) disposed inside of the casing 15 and includes the reservoir 23 for storing dust removed by the cleaner; the reclosable cover 24 reclosably attached to the reservoir 23; and dust collector (the dust collection brush 25) for recovering the dust removed by the cleaner in the reservoir 23. The cleaner is rotatably supported at both ends of the reservoir 23 by means of the horizontal rotary shaft 22a and has an urging member (a spring member) for urging the cleaner toward the inside of the reservoir 23. The dust collector is rotatably supported at both ends of the reservoir 23 by means of the horizontal rotary shaft 23a and has an urging member (a spring member) for urging the dust collector toward the cleaner and the lever 25d joined to one end of the horizontal rotary shaft 23a of the dust collector. The reclosable cover 24 has an arm 24a opposing the lever 25d joined to one end of the horizontal rotary shaft 25a of the dust collector. The dust collector is separated from the cleaner by means of closing the reclosable cover 24 and pressing the lever 25d with the arm 24a. On account of this, even when the cleaner remains drawn to the inside of the dust box 21 along with internal cleaning operation of the cleaning unit 5, the dust collector can be separated from the cleaner by means of closing only the reclosable cover 24, which is normal operation, after internal cleaning of the cleaning unit 5. Therefore, when the reclosable cover 24 is closed, the cleaner can be put in the dust box with the urging member of the cleaner.

In the embodiment described thus far, the filter driver 18 reciprocally moves the filter 4 while the cleaning unit 5 stays stationary. However, the present invention is not limited to such an embodiment. There may also be provided cleaning unit driver that reciprocally moves the cleaning unit 5 while the filter 4 stays stationary. The essential requirement is that the air conditioner should have at least driver that moves either the filter 4 or the cleaning unit 5.

In the embodiment described thus far, the lever 25d provided on the dust collection brush 25 is provided on the right side surface of the collection brush housing 25b of the dust collection brush 25 in the longitudinal direction thereof and turned by way of the horizontal rotary shaft 25a within the support section 23a provided on the right side of the reservoir 23. However, the present invention is not limited to the configuration, and the lever 25d may also be provided on a left side surface of the collection brush housing 25b in the longitudinal direction thereof and turned by way of the horizontal rotary shaft 25a within the support section 23a provided on the left side of the reservoir 23. In this case, the arm 24a provided on the reclosable cover 24 is also changed so as to oppose the support section 23a provided on the left side of the reservoir 23.

Moreover, in the embodiment described thus far, the cleaner is embodied as the cleaning brush 22 consisting of a brush in which brush hairs are implanted. The dust collector is embodied as the dust collection brush 25 consisting of a brush into which brush hairs are implanted. However, the present invention is not limited to these brushes. The cleaner and the dust collector may also be embodied as flat brushes formed from a soft resin, such as rubber.

What is claimed is:

1. An air conditioner comprising:
    a dust catch filter interposed between an inlet and a heat exchanger,
    a cleaning unit that removes a dust caught by the filter, the cleaning unit having a dust box equipped with a cleaner for removing the dust caught on a surface of the filter, and
    a first driver for moving either the filter or the cleaning unit, and
    a second driver provided with a cleaner drive motor for driving the cleaner,
    wherein the second driver is configured to move the cleaner to outside of the dust box and to bring the cleaner into contact with the filter when the cleaning unit starts cleaning the filter, and the second driver is configured to separate the cleaner from the filter and to put the cleaner into the dust box when the cleaning unit finishes cleaning the filter,
    wherein the cleaning unit further includes a filter hold unit for holding a back side of the filter, and the filter is sandwiched between the dust box and the filter hold unit,
    wherein the cleaner is supported so as to be rotatable around a rotary shaft which is fixed in the dust box,
        wherein the dust box is removably positioned with respect to a frame disposed in a casing and comprises: a reservoir for storing the dust removed by the cleaner, a reclosable cover reclosably attached to the reservoir, and a dust collection brush that recovers the dust removed by the cleaner in the reservoir,
    wherein the cleaner is rotatably supported at both ends of the reservoir by means of a rotary shaft, and comprises a first urging member for urging the cleaner toward inside of the reservoir,
    wherein the dust collection brush is rotatably supported at the both ends of the reservoir by a rotary shaft, and comprises a second urging member for urging the dust collection brush toward the cleaner and a lever joined to one end of the rotary shaft of the dust collection brush,
    wherein the reclosable cover comprises an arm opposing the lever, and wherein the arm is in contact with the lever when the reclosable cover is closed to separate the dust collection brush from the cleaner.

2. The air conditioner according to claim 1, wherein the first driver reciprocally moves the filter or the cleaning unit.

3. The air conditioner according to claim 1, wherein the cleaner is a cleaning brush.

4. The air conditioner according to claim 1, further comprising:
    a front frame provided with a plurality of guide members for supporting the filter, and
    wherein the first driver and the second driver are disposed on one of the plurality of guide members.

* * * * *